C. F. HEINKEL.
BROACH.
APPLICATION FILED FEB. 15, 1916.
1,287,686.
Patented Dec. 17, 1918.
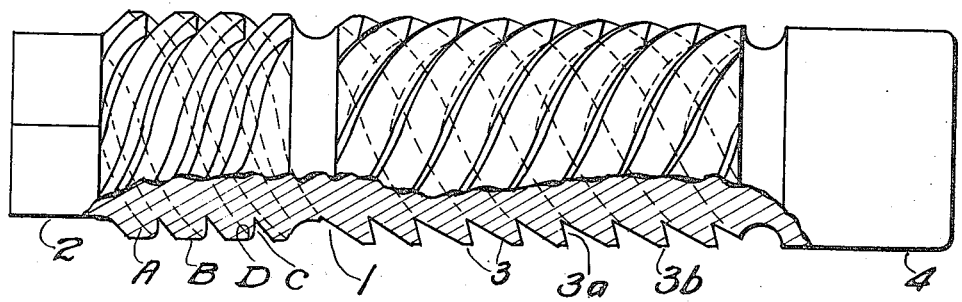
Fig. I
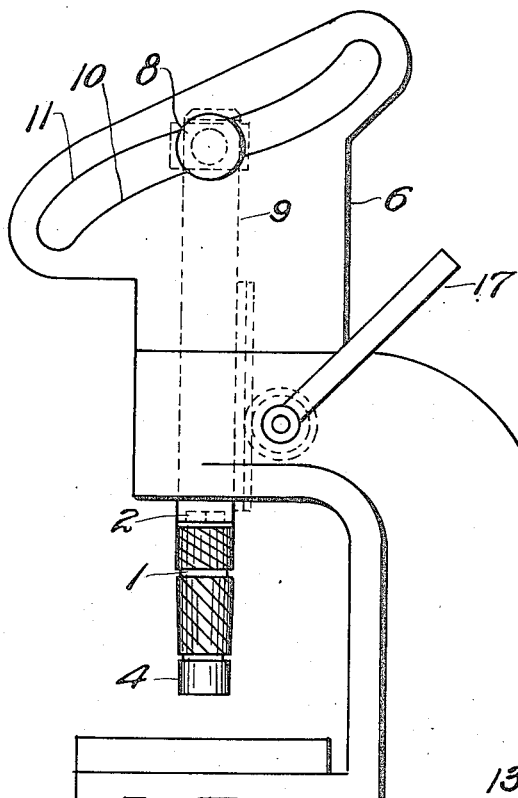
Fig. II
Witnesses:
Oscar F. Dean
John Katsch
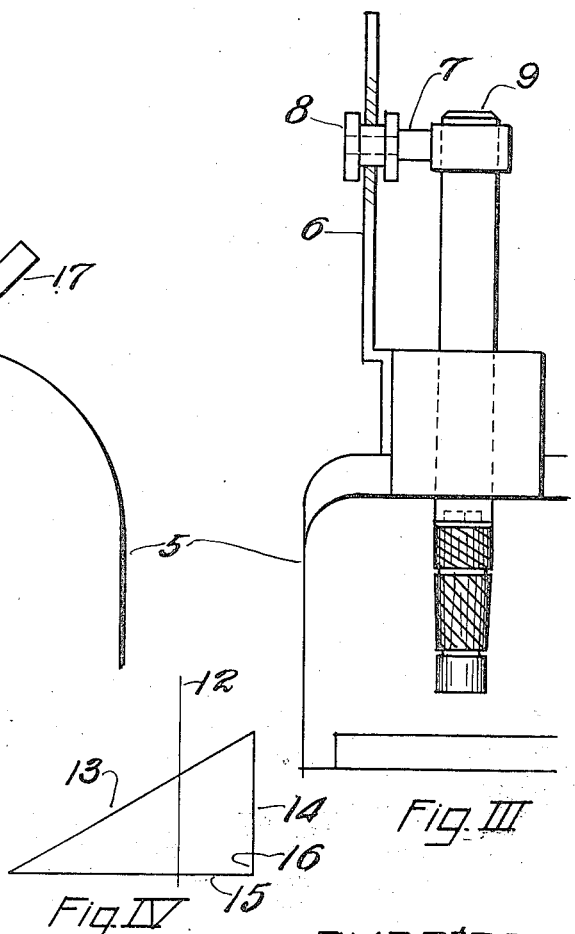
Fig. III
Fig. IV
Inventor:
Christian F. Heinkel

UNITED STATES PATENT OFFICE.

CHRISTIAN F. HEINKEL, OF CLEVELAND, OHIO.

BROACH.

1,287,686.

Specification of Letters Patent.

Patented Dec. 17, 1918.

Application filed February 15, 1916. Serial No. 78,439.

*To all whom it may concern:*

Be it known that I, CHRISTIAN F. HEINKEL, a citizen of the United States, residing at Cleveland, in the county of Cuyahoga and State of Ohio, have invented a new and useful Broach, of which the following is a specification.

This invention relates to broaches which have spiral teeth and has for its object to broach openings better than heretofore and to do so economically.

I attain this object by the broach and the mechanism shown in the accompanying drawing in which Figure I is a general side view of a broach partly broken away to show the teeth clearly; Fig. II is a side view of a machine adapted to use the broach shown in Fig. I; Fig. III is an end view of Fig. II; and Fig. IV is a diagrammatic view to illustrate the relation between the spiral on the broach teeth, the vertical travel of the machine spindle, and the rotary motion of the machine spindle.

Similar reference characters refer to similar parts throughout the views.

Heretofore, broaches have been made with the cutting faces of the teeth square with the longitudinal axis of the broach. Such construction requires a comparatively large amount of power to operate the broach and the opening so broached is not as smooth as desired. The present invention aims to overcome these disadvantages by the employment of the well known principle of a spiral reamer on a broach. A spiral reamer has many advantages over a straight fluted reamer which is well known in the art, but either the straight fluted or the spiral reamer requires a continuous rotary motion with a comparatively small feed longitudinally. In order to finish an opening more economically than can be done with a reamer, broaches have been employed. These broaches may be forced through an opening much more rapidly than a reamer but, owing to the usual square relation of the cutting teeth with the longitudinal axis of the broach, the opening so broached was not sufficiently smooth. To overcome this, the present invention provides spiral teeth on a broach and when deemed advisable, or convenient, or advantageous, provides for a turning or rotary motion of the broach in connection and simultaneously with the longitudinal motion thereof whereby a shaving cut and consequently a smoother cut is attained. Such turning or rotary motion can, of course, be provided on round broaches only.

This invention then is a combination of the old style spiral reamer and broach, combined in such a manner that a finish equal to that of a reamer is attained by an action equal to that of a broach.

This opening statement serves to give a general idea of the present invention; other features, contributory or otherwise, such as burnishing members for instance, will appear later in the specification and still others will become obvious therein.

In carrying out my invention, I prefer to construct the broach as shown in Fig. I, where the body 1 has the flat or square end 2 and the cutting teeth 3.

The face $3^a$ of these teeth is, preferably, undercut as shown to provide a cutting rake when the broach is to operate on such materials as iron and steel. The teeth 3 are spiral or angularly disposed in relation with the axis of the broach and this angularity is governed by the apparatus which operates the broach, by the material to be cut by the broach, and by whether or not a turning motion is given to the broach. Generally speaking, this angularity or inclination of the cutting teeth to the longitudinal axis of the broach should be more for a broach with a turning motion than for one without it.

In order to impart a rotary or turning motion to the broach from the operating spindle, some means should be provided for that purpose on the broach as for instance the square end 2 on the body 1 in the present instance although other means may be employed to accomplish the same purpose. The downward motion of the broach may be accomplished by merely letting a flat surface on the end of the operating spindle of a machine act against the flat end of the body 1, but it is preferred that the broach have some float. This float may be provided by making the square opening in the end of the spindle somewhat larger than the square end 2 so that the broach, or rather the square end thereof, may float in the spindle opening.

In order to guide the broach, or to locate the article to be broached in proper location to the broach, or both, some means should be provided for that purpose such as the pilot 4 in the present instance. An additional pilot or pilots may also be provided on other portions of the body when required or advantageous.

The broach being made of suitable material and properly hardened is tapered, longitudinally, on that portion which carries the teeth 3. The pilot 4 being straight, longitudinally, and slightly smaller in diameter than the opening to be broached while that portion of the broach which carries the burnishing members is, preferably, straight longitudinally and of the same diameter as the opening is to be after broaching. These members may however taper slightly. These tapered portions are, preferably, provided in the final grinding or sharpening operation of the broach after the same is hardened. For most purposes of broaching it is preferred that the face 3ᵇ be made parallel with the axis of the broach and is not relieved or backed off as for instance the teeth of a reamer or milling cutter are backed off.

A burnishing member may be provided on the broach when an opening is to be burnished. In the present instance, the burnishing member consists of the spiral teeth A which are cut on the body 1, preferably immediately behind the teeth 3 as shown. It is preferred that these teeth have a short flat surface B and that the side C joins the flat surface B by a curve D as shown, the object being to have no edge or sharp portion or projection on the leading face of these teeth so that the material on the wall of the opening to be broached will be forced or squeezed out and not cut away as is done by the teeth 3. The spiral of these teeth is, preferably, of a different angle than the spiral of the teeth 3 although the same angle will give good results. The choice of this angle of the teeth depends mainly upon the material to be burnished and should be governed thereby.

A machine adapted to use the broach shown in Fig. I is shown in Figs. II and III where an ordinary arbor press 5 is provided with the cam 6 and the lever 7 which carries the roller 8 as shown. The lever 7 being fastened rigidly to the spindle 9 by its end opposite the roller 8.

The cam 6, preferably, has the two cam faces 10 and 11; the face 10 being for the purpose of imparting a rotary motion to the spindle 9 when this spindle travels downward, while the face 11 is for the purpose of imparting a rotary motion to the spindle 9, in opposite direction to the rotary motion produced by the face 10 as stated, when the spindle 9 travels upward, and finally to bring it back to the starting point when it is in its highest position.

This turning or rotary motion of the spindle may be accomplished in a variety of ways; the idea being to provide a turning or rotary motion to the spindle while the same is traveling longitudinally.

The angle of the cam faces 10 and 11 should bear a definite relation to the angularity of the teeth on the broach. When it is desired that the teeth have no cutting rake, the cam faces 10 and 11 and the angularity of the teeth should be so arranged that while the spindle travels downwardly a certain distance, it also rotates through a certain angle.

This is best illustrated in Fig. IV where the line 12 represents the longitudinal axis of the spindle and the broach, the line 13 represents the cutting face of the teeth on the broach, the line 14 represents the longitudinal travel of the spindle, and the line 15 represents the circumferential travel of the cutting face of the teeth. The angle 16 being a right angle in this instance. When, however, a cutting rake, either positive or negative, is required, this angle 16 will be greater or smaller than a right angle as the particular case may require. The length of the lever 7 and the distance of the cam 6 from the spindle, the angularity of the cutting face of the teeth, and the lengths of the line 14 and 15 will determine the angle of the cam faces 10 and 11.

The angle 16 may remain a right angle in all cases and the angle of the cutting faces of the teeth may be varied to produce a positive or negative cutting rake, in which case the same cam can be used for the same broaching operation but in different materials. This arrangement may be preferred since it is best that the teeth themselves have different cutting rakes for different materials and while a separate broach is usually made for different materials, the angle may as well be different, but the cam on the machine or the rotary motion of the spindle may be the same for different angles of cutting teeth.

In carrying out my invention, I prefer to give the broach a downward or longitudinal motion in combination and simultaneously with a rotary or turning motion. The object being to broach a smooth and accurate opening in the least possible time and to remove the surplus material in the opening mainly by cutting and leave a very small margin of surplus material to be forced out by the burnishing members A when they are employed.

The operation of the apparatus and the broach shown is as follows:

The broach being inserted in the opening in the spindle 9, the lever 17 is pulled downward, the spindle 9 with the broach will then move downward, but since the roller 8 is in the slot in the cam 6, the spindle and the broach will be given a rotary motion while it is moving downward. During this downward and rotary motion of the broach, the cutting teeth 3 will remove all surplus material and size the opening and, thereafter, the burnishing members will smooth and finally finish the opening.

It is thought obvious now that the present invention provides a broach which is economical in construction since the teeth thereon can readily be cut as for instance similar to a thread on a screw while formerly the teeth had to be spaced and cut successively and separately; the grinding of the present teeth is also more economical since the emery or sharpening wheel is always acting on some portion of the teeth whereas in spaced teeth the wheel runs off and on the tops of the teeth which action produces a slight curve at the edges whereby some of the effectiveness of the cutting edge is destroyed; and further, a broach with spiral teeth does not crack as easy while hardening as one with spaced teeth since the spiral teeth provide a more uniform cross-section whereas the spaced teeth have a heavy cross-section through the teeth followed by a lighter cross-section through the grooves which irregularity of cross-section causes unequal expansion and contraction in the broach while hardening and consequently liability to crack which is eliminated to a considerable extent by the spiral teeth of the present invention.

The present broach is economical in operation since an opening equal to a reamed opening can be produced thereby in the same time that a rougher opening could formerly be produced by a broach.

The present invention is efficient since it produces its work by a shaving cut which requires less power, produces better work, and keeps its edge longer than the old tools; and further, the burnishing members smooth the opening to a high degree even if the cutting teeth become dull and do not of themselves produce a smooth opening.

The mechanism shown and described illustrates one application of the present invention and it should be understood that modifications can be devised which come within the scope of the appended claims.

I claim:

1. A tool of the character described having a body, spiral cutting teeth formed on the body similar to screw threads, in combination with means to longitudinally and rotatably operate said tool to broach the work, said longitudinal movement being greater for each rotation of the tool than the pitch of said teeth.

2. A tool of the character described having a body, spiral cutting teeth formed on the body similar to screw threads, a burnishing member formed on the body, in combination with means to longitudinally and rotatably operate said tool to broach the work, said longitudinal movement being greater for each rotation of the tool than the pitch of the said teeth.

3. A tool of the character described having a body, spiral cutting teeth formed on the body similar to screw threads, spiral burnishing members formed on the body similar to screw threads, in combination with means to longitudinally and rotatably operate said tool to broach the work, said longitudinal movement being greater for each rotation of the tool than the pitch of said teeth.

CHRISTIAN F. HEINKEL.

Witnesses:
 Oscar F. Dean,
 John Kalsch.